US010038205B2

(12) United States Patent
Wake et al.

(10) Patent No.: US 10,038,205 B2
(45) Date of Patent: Jul. 31, 2018

(54) FUEL CELL SYSTEM

(71) Applicant: HONDA MOTOR CO., LTD., Tokyo (JP)

(72) Inventors: Chihiro Wake, Saitma (JP); Tomohisa Kamiyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 108 days.

(21) Appl. No.: 14/720,521

(22) Filed: May 22, 2015

(65) Prior Publication Data

US 2015/0255814 A1    Sep. 10, 2015

Related U.S. Application Data

(63) Continuation of application No. 13/804,367, filed on Mar. 14, 2013.

(30) Foreign Application Priority Data

Mar. 14, 2012 (JP) ................... 2012-057342

(51) Int. Cl.
*H01M 8/04* (2016.01)
*H01M 8/04089* (2016.01)
(Continued)

(52) U.S. Cl.
CPC ..... *H01M 8/04097* (2013.01); *H01M 8/0432* (2013.01); *H01M 8/04223* (2013.01);
(Continued)

(58) Field of Classification Search
CPC ........ H01M 8/04097; H01M 8/04223; H01M 8/0432; H01M 8/04753; H01M 8/04761;
(Continued)

(56) References Cited

U.S. PATENT DOCUMENTS 5,543,238 A    8/1996 Strasser
2003/0012989 A1   1/2003 Ueda et al.
(Continued)

FOREIGN PATENT DOCUMENTS

DE    10 2004 057 140 A1    6/2006
DE    11 2005 000 061 T5    2/2007
(Continued)

OTHER PUBLICATIONS

German Search Report, German Patent Application No. 10 2013 204 455.0 dated Jul. 15, 2013.

*Primary Examiner* — Jonathan G Jelsma
(74) *Attorney, Agent, or Firm* — Squire Patton Boggs (US) LLP

(57) ABSTRACT

The present invention provides a fuel cell system that can quickly decrease a current/voltage characteristic. A fuel cell system includes an introduction piping which connects a discharging piping and a supply piping in communication with each other, and which introduces part of oxidant-off gas in the supply piping, and a circulation on-off valve provided in the introduction piping. The fuel cell system decreases the supply amount of air by an air compressor when a fuel cell is activated at a low temperature to decrease the air-stoichiometry of the fuel cell, and opens the circulation on-off valve to introduce the oxidant-off gas in the supply piping through the introduction piping, thereby causing the oxidant-off gas to circulate.

9 Claims, 9 Drawing Sheets

(51) Int. Cl.
- *H01M 8/2457* (2016.01)
- *H01M 8/04228* (2016.01)
- *H01M 8/04225* (2016.01)
- *H01M 8/04223* (2016.01)
- *H01M 8/0432* (2016.01)
- *H01M 8/04746* (2016.01)
- *H01M 8/04537* (2016.01)

(52) U.S. Cl.
CPC ... *H01M 8/04225* (2016.02); *H01M 8/04228* (2016.02); *H01M 8/04753* (2013.01); *H01M 8/04761* (2013.01); *H01M 8/2457* (2016.02); *H01M 8/04268* (2013.01); *H01M 8/04559* (2013.01); *H01M 8/04589* (2013.01)

(58) Field of Classification Search
CPC ......... H01M 8/04225; H01M 8/04907; H01M 8/04544; H01M 8/04552; H01M 8/04559
See application file for complete search history.

(56) References Cited

U.S. PATENT DOCUMENTS

| | | |
|---|---|---|
| 2005/0058860 A1* | 3/2005 | Goebel ............ H01M 8/04014 429/415 |
| 2007/0077466 A1 | 4/2007 | Akiyama et al. |
| 2008/0026268 A1 | 1/2008 | Zeng |
| 2009/0269628 A1* | 10/2009 | Imanishi ........... H01M 8/04089 429/421 |
| 2010/0021783 A1 | 1/2010 | Osada et al. |
| 2010/0047663 A1* | 2/2010 | Manabe ............ H01M 8/04089 429/414 |
| 2010/0055522 A1 | 3/2010 | Manabe et al. |
| 2010/0167144 A1* | 7/2010 | Kaito .................... H01M 8/06 429/429 |
| 2010/0167152 A1 | 7/2010 | Hocho et al. |

FOREIGN PATENT DOCUMENTS

| | | |
|---|---|---|
| DE | 11 2008 001 579 T5 | 4/2010 |
| DE | 10 2012 207 789 A1 | 11/2012 |
| JP | 8-500931 A | 1/1996 |
| JP | 2008-226591 A | 9/2008 |

* cited by examiner

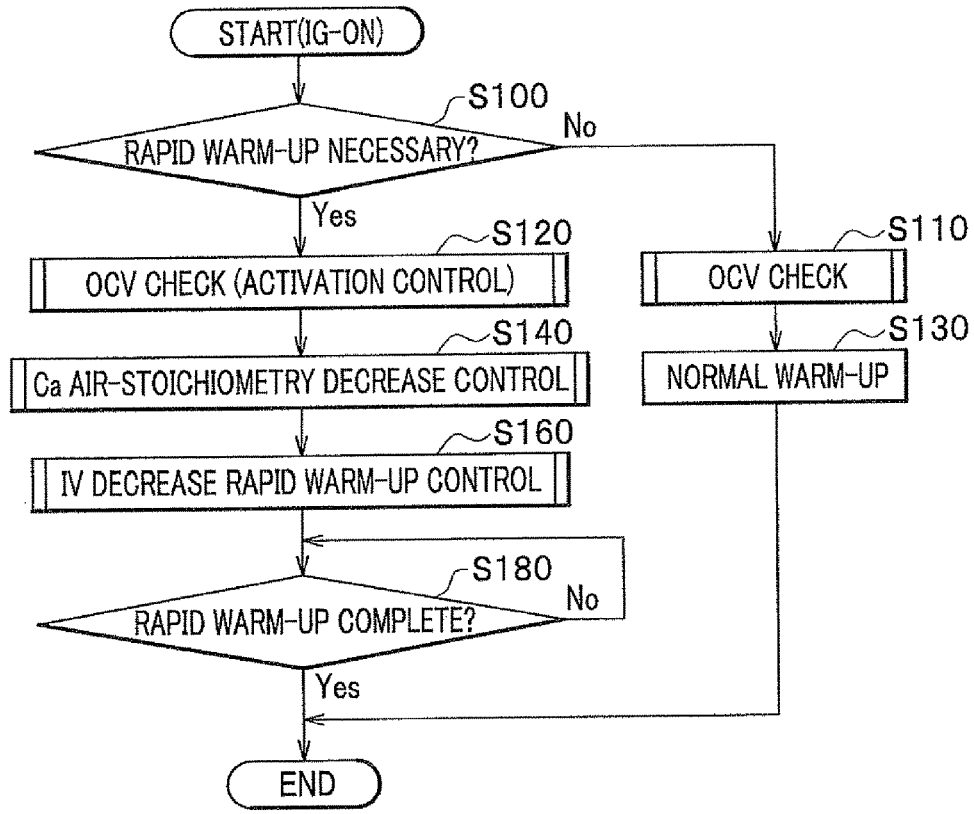
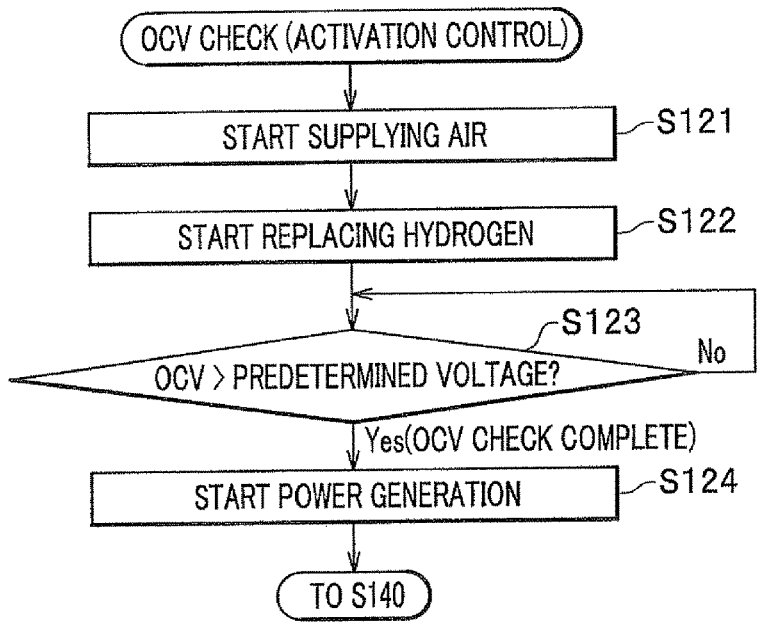

FUEL CELL SYSTEM

CROSS REFERENCES TO RELATED APPLICATION

The present application is a 37 C.F.R. § 1.53(b) continuation of co-pending U.S. patent application Ser. No. 13/804,367 filed Mar. 14, 2013, which claims priority on Japanese Patent Application No. 2012-057342, filed Mar. 14, 2012, the entire contents of all which are hereby incorporated by reference.

BACKGROUND OF THE INVENTION

Field of the Invention

The present invention relates to a fuel cell system including an EGR (Exhaust Gas Recirculation) that circulates cathode-off gases.

Description of the Related Art

JP H8-500931 A discloses a technology of a cathode circulation system having an exhaust piping through which air-off gases (oxidant-off gases) flow to a cathode and a supply piping for supplying air (oxidant gases) connected together to the exhaust piping and causing the air-off gases in the exhaust piping to return to the supply piping to circulate a cathode-off gas in the system in order to discharge produced water remaining in the cathode of a fuel cell.

JP 2008-226591 A discloses a technology of reducing a stoichiometric amount of air (oxidant gases) to perform low-efficiency power generation in comparison with a normal operation, thereby promoting the warm-up.

When, however, JP H8-500931 A and JP 2008-226591 A are combined to immediately start the circulation of the oxidant-off gases when performing the low-efficiency power generation by reducing the stoichiometric amount of oxidant gases, there is a disadvantage that the amount of oxygen contained in the oxidant gases in the circulation system does not decrease, and it is difficult to quickly decrease a current/voltage characteristic (IV characteristic).

The present invention has been made to address the conventional disadvantage, and it is an object of the present invention to provide a fuel cell system that can quickly decrease a current/voltage characteristic.

SUMMARY OF THE INVENTION

An aspect of the present invention provides a fuel cell system that includes: a fuel cell which comprises an anode and a cathode and which generates power when a fuel gas and an oxidant gas are supplied to the anode and the cathode, respectively; an oxidant gas supplying unit that supplies the oxidant gas to the cathode; an oxidant gas supplying flow channel through which the oxidant gas to be supplied to the cathode flows; an oxidant-off gas discharging flow channel through which an oxidant-off gas discharged from the cathode flows; an oxidant-off gas introducing flow channel which is in communication with the oxidant-off gas discharging flow channel and the oxidant gas supplying flow channel, and which introduces part of the oxidant-off gas to the oxidant gas supplying flow channel; a circulation on-off valve provided in the oxidant-off gas introducing flow channel; a stoichiometry decreasing process unit which decreases a supply amount of the oxidant gas by the oxidant gas supplying unit when a predetermined condition is satisfied and decreases a stoichiometry of the oxidant gas of the fuel cell to decrease a current/voltage characteristic of the fuel cell; and an oxidant-off gas circulating process unit which opens the circulation on-off valve after a process by the stoichiometry decreasing process unit to introduce the oxidant-off gas into the oxidant gas supplying flow channel through the oxidant-off gas introducing flow channel, and causes the oxidant-off gas to circulate.

According to such a structure, after the stoichiometry decreasing process unit decreases in advance the stoichiometry of the oxidant gases, the circulation on-off valve is opened to introduce the oxidant-off gases from the oxidant-off gas discharging flow channel to the oxidant gas supplying flow channel via the oxidant-off gas introducing flow channel to let the oxidant-off gases circulated, thereby sufficiently decreasing the oxygen concentration contained in the oxidant gases in the cathode circulation system (oxidant gas supplying flow channel, cathode flow channel in fuel cell, oxidant-off gas discharging flow channel, and oxidant-off gas introducing flow channel) before the circulation starts. Accordingly, the current/voltage characteristic (IV characteristic) can be quickly decreased to a predetermined IV characteristic.

In addition, the circulation of the oxidant-off gases is started by the oxidant-off gas circulating process unit after the process by the stoichiometry decreasing process unit, and thus the discharging of the generated water remained in the fuel cell is promoted, thereby ensuring the stable power generation of the fuel cell. That is, in the process by the stoichiometry processing unit, only the oxygen concentration decreases, but the amount of gases itself flowing through the cathode circulation system is surely maintained, and thus an occurrence of flooding is suppressed, thereby ensuring the stable power generation.

The fuel cell system of the above aspect may further include a low-temperature activation determining unit which determines whether or not the fuel cell is in a low-temperature activation condition when the fuel cell is activated, in which when determining that the fuel cell is in a low-temperature activation condition, the low-temperature activation determining unit may determine that the predetermined condition is satisfied.

According to such a structure, after the current/voltage characteristic (IV characteristic) is quickly decreased, the low-temperature activation (warm-up operation) is started. Accordingly, the operation (low-efficiency operation) with the current/voltage characteristic being decreased is quickly started, and thus the warm-up operation can be completed quickly. The operation (low-efficiency operation) with the current/voltage characteristic being decreased means to increase the internal resistance of the fuel cell by daringly causing the fuel cell to generate power at a low efficient condition, to increase the amount of self heat generation of the fuel cell, and to perform rapid warm-up.

The fuel cell system of the above aspect may further include a discharging on-off valve provided in the oxidant-off gas discharging flow channel at a downstream side of a communication point with the oxidant-off gas introducing flow channel, in which the oxidant-off gas circulating process unit may open the circulation on-off valve and close the discharging on-off valve.

According to this structure, by opening the circulation on-off valve and closing the discharging on-off valve, the whole amount of the oxidant-off gases can be introduced in the oxidant-off gas introducing flow channel to let such gases to circulate, thereby surely maintaining the sufficient circulation amount of the oxidant-off gases.

The fuel cell system of the above aspect may further include a current/voltage characteristic attainment determining unit which determines whether or not the current/voltage characteristic reaches a predetermined current/voltage characteristic, in which when the current/voltage characteristic attainment determining unit determines that the current/voltage characteristic reaches the predetermined current/voltage characteristic, the stoichiometry decreasing process unit may terminate the process of decreasing the stoichiometry.

According to such a structure, it becomes possible to surely determine through the current/voltage characteristic attainment determining unit that the current/voltage characteristic has decreased, and thus a control like a warm-up operation after that determination can be performed rapidly. It can be determined whether or not the predetermined current/voltage characteristic has attained through, for example, detecting a voltage (a total voltage of all single cells) of the fuel cell.

The fuel cell system of the above aspect may further include a clocking unit that counts a time elapsed after a decrease of the stoichiometry is started, in which when the elapsed time counted by the clocking unit reaches a predetermined time, the stoichiometry decreasing process unit may terminate the process of decreasing the stoichiometry.

According to such a structure, the determination is carried out based on an elapsed time after the start of the decrease of the stoichiometry, i.e., the time, thereby simplifying the control.

According to the present invention, a fuel cell system is provided that can quickly decrease a current/voltage characteristic.

BRIEF DESCRIPTION OF THE DRAWINGS

FIG. 2 is a flowchart illustrating an operation at the time of rapid warm-up control;

FIG. 3 is a flowchart illustrating an operation at the time of OCV checking;

DETAILED DESCRIPTION OF THE PREFERRED EMBODIMENT

A detailed explanation will be given of an embodiment of the present invention with reference to the accompanying drawings as needed. The explanation will be given of an example case in which a fuel cell system 1 is installed in a fuel cell electric vehicle, but the present invention is not limited to the fuel cell electric vehicle. The present invention can be applied to ships and aircrafts having the fuel cell system installed therein, and can be also applied to a stationary fuel cell system for home or business use.

Figure 1:
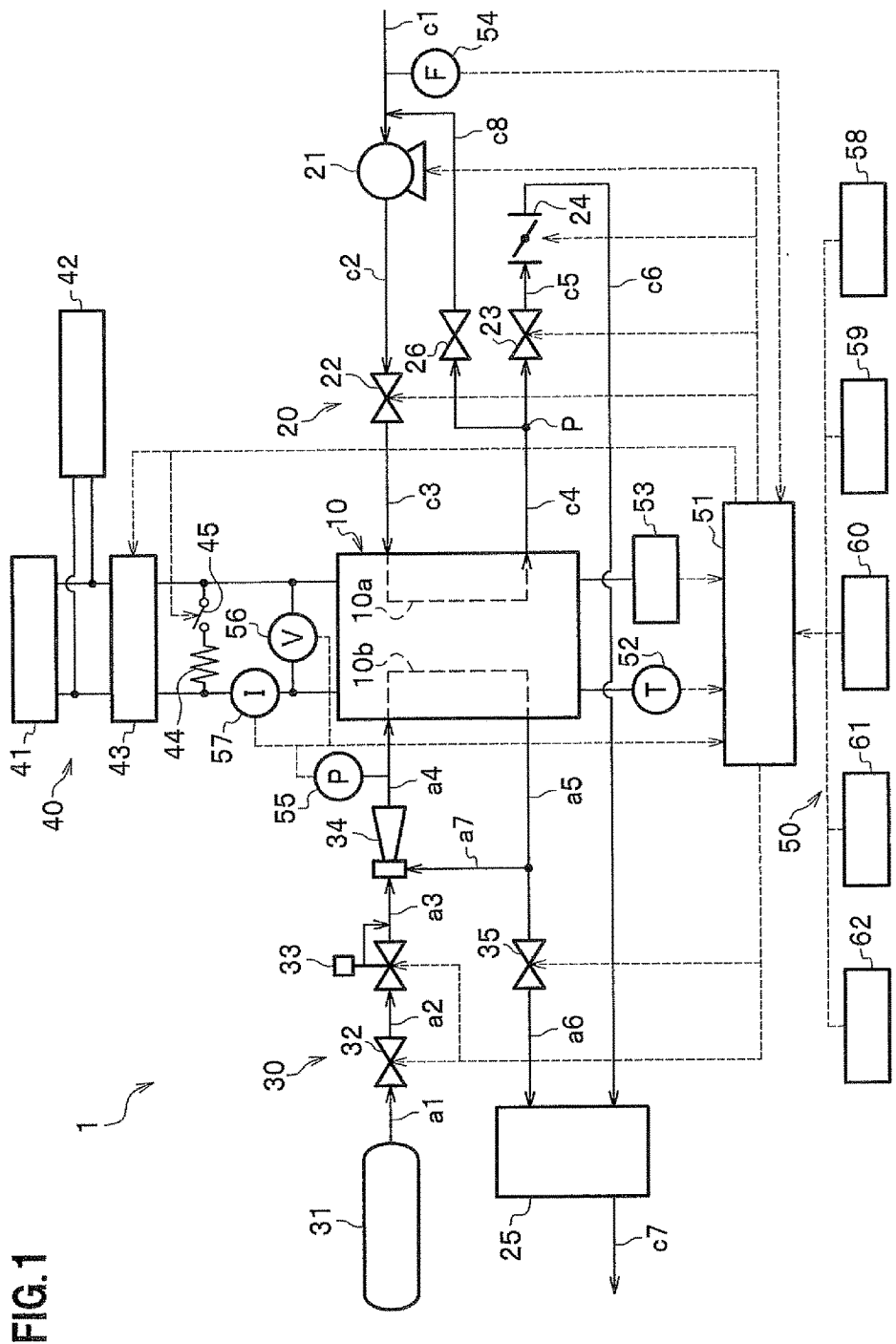
FIG. 1 is a whole configuration diagram illustrating a fuel cell system according to an embodiment of the present invention.

FIG. 1 is a whole configuration diagram illustrating a fuel cell system according to an embodiment of the present invention. The fuel cell system 1 includes a fuel cell 10, a cathode system 20, an anode system 30, a power-consumption system 40, and a control system 50, etc.

The fuel cell 10 is, for example, a fuel cell stack having a plurality of single solid polymer cells (not shown) stacked together, and the plurality of single cells are electrically connected together in series. Each of the single cells includes an MEA (Membrane Electrode Assembly), a cathode separator (not shown) and an anode separator (not shown) sandwiching the MEA and having a conductive property.

The MEA includes an electrolyte membrane (solid polymer electrolyte membrane) that is a monovalent cation exchange membrane (e.g., perfluoro-sulfone based), and an anode and a cathode sandwiching such a membrane. The anode and the cathode are each mainly formed of a porous conduction material like a carbon paper, and include a catalyst (e.g., Pt or Ru) that causes an electrode reaction on the anode and the cathode.

Formed in the cathode separator is a cathode flow channel 10a like a groove for supplying and discharging air (oxidant gases) to and from the cathode of each MEA. Formed in the anode separator is an anode flow channel 10b like a groove for supplying and discharging hydrogen (fuel gases) to and from the anode of each MEA.

When air (oxygen) is supplied to each cathode through the cathode flow channel 10a, and hydrogen is supplied to each anode through the anode flow channel 10b, there is a potential difference (OCV (Open Circuit Voltage)) between the cathode and the anode in each single cell. Next, when the fuel cell 10 is electrically connected with an external load, such as a running motor 41 or a high-voltage battery 42, and a current flows out of the fuel cell 10 and the fuel cell 10 starts power generation.

The cathode system 20 includes an air compressor 21 (oxidant gas supply unit), a first cut-off valve 22, a second cut-off valve 23 (discharging on-off valves), a backpressure valve 24, a diluter 25, a circulation on-off valve 26, supply pipings c1 to c3 (oxidant gas supplying flow channels), discharging pipings c4 to c7 (oxidant-off gas discharging flow channels), and an introduction piping c8 (oxidant-off gas introducing flow channel), etc.

In the cathode system 20, the supply piping c1 is connected to the inlet of the cathode flow channel 10a via the air compressor 21, the supply piping c2, the first cut-off valve 22, and the supply piping c3. According to the present embodiment, the supply pipings c1 to c3 constitute an oxidant gas supply flow channel.

In the cathode system 20, the outlet of the cathode flow channel 10a is connected to the discharging piping c7 via the discharging piping c4, the second cut-off valve 23, the discharging piping c5, the backpressure valve 24, the discharging piping c6, and the diluter 25. According to the present embodiment, the discharging pipings c4 to c7 constitute an oxidant-off gas discharging flow channel.

The air compressor 21 is, for example, electric motor-driven type, and supplies compressed external air (air) taken through the supply piping c1 to the cathode flow channel 10a of the fuel cell 10. The air compressor 21 increases the amount of gas taken through the intake port of the air compressor 21 by increasing the rotation speed of the motor, and decreases the amount of gas taken through the intake port by decreasing the rotation speed of the motor.

The first cut-off valve 22 and the second cut-off valve 23 are, for example, of a normally closed type and an electromagnetic actuation type, disposed at the upstream side of the fuel cell 10 and the downstream side thereof. When both valves are closed, the cathode flow channel 10a is plugged. The reason why those first and second cut-off valves 22 and 23 are provided is to prevent external air from flowing into the cathode flow channel 10a when the fuel cell 10 is terminating the power generation (when the fuel cell 10 and the external load are electrically disconnected), thereby suppressing an occurrence of an OH radical (hydro-radical), etc., with high activity, an oxidization of the electrode catalyst layer by the hydro-radical, and a deterioration of the fuel cell 10.

The second cut-off valve 23 is located at the downstream side of a connection P (communication point) branched from the discharging piping c4 and connected with the introduction piping c8 to be discussed later.

The backpressure valve 24 is, for example, a butterfly valve having its open angle variable, and has a function of adjusting the cathode pressure at the cathode flow channel 10a. When, for example, the fuel cell electric vehicle is accelerated, the open angle is adjusted in the close direction, thereby adjusting the cathode pressure so as to increase the cathode pressure.

The diluter 25 has a function of diluting hydrogen discharged from the anode flow channel 10b to a predetermined concentration by air-off gases (oxidant-off gases, cathode-off gases) discharged from the cathode flow channel 10a. The hydrogen diluted by the diluter 25 is discharged to the ambient air (exterior of vehicle, external space) via the discharging piping c7 together with the oxidant-off gases.

The inlet piping c8 is a flow channel to return the oxidant-off gases discharged from the cathode flow channel 10a to the upstream side of the cathode flow channel 10a, has one end (upstream end) connected to the discharging piping c4, and has another end (downstream end) connected to the supply piping c1.

The circulation on-off valve 26 is, for example, of a normally closed type and an electromagnetic actuation type, and is provided in the introduction piping c8. The circulation on-off valve 26 is closed during normal power generation, but is opened when a predetermined condition to be discussed later is satisfied, allows the oxidant-off gases to flow in the introduction piping c8 to circulate the oxidant-off gases.

It is not illustrated in the figure but the cathode system 20 includes a humidifier through which, for example, the supply piping c3 and the discharging piping c4 run. This humidifier includes a function of humidifying air supplied from the air compressor 21, allows air from the air compressor 21 not subjected to the humidification yet to flow to either one of the interior or the exterior of, for example, a hollow fiber membrane of a hollow fiber membrane bundle retained in a case, and allows the oxidant-off gases (oxidant-off gas) to flow to another side, thereby performing moisture exchange between the air not subjected to humidification and the oxidant-off gases to humidify the air not subjected to humidification yet with the oxidant-off gases.

The anode system 30 includes a high-pressure hydrogen tank 31, a shut-off valve 32, a pressure reducing valve 33, an ejector 34, a purging valve 35, supply pipings a1 to a4, discharging pipings a5 and a6, and a return piping a7, etc.

In the anode system 30, the high-pressure hydrogen tank 31 is connected to the inlet of the another flow channel 10b through the supply piping a1, the shut-off valve 32, the supply piping a2, the pressure reducing valve 33, the supply piping a3, the ejector 34, and the supply piping a4. Moreover, in the anode system 30, the outlet of the anode flow channel 10b is connected to the diluter 25 through the discharging piping a5, the purging valve 35, and the discharging piping a6. Furthermore, the discharging piping a5 is connected with a branched end (upstream-side end) of the return piping a7, and another end (downstream-side end) of the return piping a7 is connected to the ejector 34.

The high-pressure hydrogen tank 31 is charged with highly purified hydrogen at an extremely high pressure, such as 35 MPa or 70 MPa.

The shut-off valve 32 is, for example, of a normally closed type and an electromagnetic actuation type, and when such a valve is opened, the hydrogen in the high-pressure hydrogen tank 31 is supplied to the fuel cell 10.

The pressure reducing valve 33 has a function of reducing the pressure (primary pressure) of the hydrogen supplied from the high-pressure hydrogen tank 31 to a predetermined secondary pressure. Moreover, the pressure reducing valve 33 adjusts the secondary pressure based on an electric signal from a control unit 51. The anode system 30 may employ a structure that reduces the pressure step by step through a plurality of pressure reducing valves.

The ejector 34 has a function of producing a negative pressure utilizing the flow of the hydrogen flowing from the high-pressure hydrogen tank 31, suctioning unreacted hydrogen discharged from the outlet of the anode flow channel 10b of the fuel cell 10 through the return channel a7, and returning the suctioned unreacted hydrogen to the anode flow channel 10b again. A motor-driven pump, etc., for hydrogen circulation may be provided in the return channel a7 instead of the ejector 34.

The purging valve 35 is, for example, of a normally closed type and an electromagnetic actuation type, and has a function of being periodically opened in accordance with an instruction from the control unit 51, and discharging impurities (e.g., nitrogen and produced water in air through the anode from the cathode via the electrolyte membrane) accumulated in an anode circulation system (anode flow channel 10b, supply piping a4, discharging piping a5, and return piping a7) to the diluter 25.

It is not illustrated in the figure but the anode system 30 includes an gas-liquid separator that separates moisture (liquid) and gases and a discharging unit for discharging the produced water in the gas-liquid separator both provided near the outlet of the anode flow channel 10b in the anode circulation system to the diluter 25.

The power-consumption system 40 supplies power to the external load, such as the running motor 41, the high-pressure battery 42 or various accessories (including the air compressor 21), and includes a power controller 43, and a discharging resister 44, etc.

The running motor 41 includes a permanent-magnet type three-phase AC synchronous motor, etc., and rotates and drives drive wheels of the fuel cell electric vehicle through an inverter circuit (not shown) that converts a DC to an AC.

The high-pressure battery 42 has a function of, for example, supplying power to the running motor 41, and storing regenerative energy at the time of braking using the running motor 41 as a power generator, and is a nickel hydride battery, a lithium ion battery, or a capacitor, etc.

The power controller 43 includes a DC/DC converter, etc., is provided between the fuel cell 10 and the external load like the running motor 41, and controls power (generated current) taken out from the fuel cell 10 based on a power generation instruction from the control unit 51 to be discussed later.

The discharging resistor 44 has a function of causing the fuel cell 10 to discharge energy, and is provided between the fuel cell 10 and the power controller 43. Regarding this discharging resistor 44, when a switch (open/close element) 45 is turned on (closed) by the control unit 51 to be discussed later, the generated current by the fuel cell 10 flows through the discharging resistor 44, and thus the fuel cell 10 discharges energy. Accordingly, the fuel cell 10 can be prevented from being kept at a high potential for long hours, which is caused by reaction between hydrogen and oxygen in the air, while no electricity from the fuel cell 10 to the external load is being consumed. As a result, a progress of deterioration in the catalyst used in the anode or cathode electrode of the fuel cell 10 can be prevented.

The control system 50 includes the control unit 51. The control unit 51 is connected with a temperature sensor 52, a cell voltage (cell V) sensor 53, a flow-volume sensor 54, a pressure sensor 55, a voltage sensor 56, a current sensor 57, an IG 58, an accelerator pedal 59, a brake pedal 60, a vehicle speed sensor 61, and a timer 62 (clocking unit).

The temperature sensor 52 is to detect the temperature of the fuel cell 10, and is provided in the discharging piping c4 at the outlet side of the cathode flow channel 10*a*, or the discharging piping a5 at the outlet side of the anode flow channel 10*b*, etc. The location of the temperature sensor 52 is not limited to this location, and the temperature sensor 52 may detect a temperature at the outlet of a coolant in a cooling system not shown that cools the fuel cell 10, or may directly detect the temperature of the fuel cell stack itself.

The cell voltage sensor 53 detects, for example, the voltage (cell voltage) of each single cell of the fuel cell 10, and outputs a detected value to the control unit 51. The present invention is not limited to a configuration in which all voltages are detected for individual cells, and a voltage may be detected with, for example, two single cells being as a pair.

The flow-volume sensor 54 is provided in the supply piping c1 at the upstream side of the air compressor 21, detects the flow volume of air taken from the exterior of the vehicle, and outputs a detected value to the control unit 51.

The pressure sensor 55 is provided in the supply piping a4 at the inlet side of the anode flow channel 10*b*, detects the pressure (anode pressure, An pressure) of the hydrogen supplied to the anode flow channel 10*b*, and outputs a detected value to the control unit 51.

The voltage sensor 56 detects a voltage value (a total of voltages of all single cells) output by the fuel cell 10, and outputs a detected value to the control unit 51.

The current sensor 57 measures a current value Ifc for the current flowing from the fuel cell 10, and outputs a detected value to the control unit 51.

The IG 58 is an activation switch of the fuel cell system 1, causes the fuel cell 10 to start generating power when the IG 58 is turned on, and causes the fuel cell 10 to terminate power generation when the IG 58 is turned off.

The accelerator pedal 59 is a pedal depressed by the driver to run the fuel cell electric vehicle, and is configured to output the open angle (depressed level) to the control unit 51.

The brake pedal 60 is a pedal depressed by the driver to perform braking on the fuel cell electric vehicle, and is configured to output a brake signal indicating whether or not such a brake pedal is depressed to the control unit 51.

The vehicle speed sensor 61 detects the vehicle speed of the fuel cell electric vehicle, and outputs vehicle speed information to the control unit 51.

The timer 62 measures an elapsed time after the reduction of the rotation speed of the air compressor 21 is started at the time of, for example, cathode (Ca) air-stoichiometry decrease control to be discussed later.

The control unit 51 includes a CPU (Central Processing Unit), a ROM (Read Only Memory), a RAM (Random Access Memory), various interfaces, and electric circuits, etc., and includes a stoichiometry decreasing process unit, an oxidant-off gas circulating process unit, a low-temperature activation determining unit, and a current/voltage characteristic attainment determining unit.

The control unit 51 respectively controls the rotation speed of the air compressor 21, the open/close operations of the first cut-off valve 22, the second cut-off valve 23, the circulation on-off valve 26, the shut-off valve 32, and the purging valve 35, the open angle of the backpressure valve 24, the pressure reduction ratio of the pressure reducing valve 33, and ON/OFF of the switch 45.

The stoichiometry decreasing process unit has a function of decreasing the supply amount of air by reducing the rotation speed of the air compressor 21, and decreasing the stoichiometric amount of air supplied to the fuel cell 10. The expression of decreasing the stoichiometric amount of air means to decrease the stoichiometric ratio (air supply amount/air consumption amount) that corresponds to an oxygen excessive ratio, and for example, the stoichiometric ratio is decreased from 1.8 to 1.0. By decreasing the stoichiometric amount of air in this manner, a voltage Vfc of the fuel cell 10 can be decreased.

The oxidant-off gas circulating process unit executes a process by the oxidant-off gas circulating process unit after the process by the stoichiometry decreasing process unit, and has a function of opening the circulation on-off valve 26 to introduce the oxidant-off gases discharged from the cathode flow channel 10*a* to the introduction piping c8 so that the oxidant-off gases can return to the supply piping c1 at the upstream side of the air compressor 21, thereby circulating the oxidant-off gases.

The low-temperature activation determining unit determines whether or not the fuel cell 10 is in a low-temperature activation condition (whether or not a warm-up is necessary), and determines that the fuel cell 10 is in a low-temperature activation condition when, for example, a temperature Tfc of the fuel cell 10 obtained through the temperature sensor 52 is equal to or smaller than a predetermined temperature (e.g., 0° C.).

The current/voltage characteristic attainment determining unit determines whether or not the current/voltage characteristic (IV characteristic) of the fuel cell 10 reaches a predetermined (desired) current/voltage characteristic, and determines that the predetermined (target) current/voltage characteristic is attained when, for example, the voltage Vfc of the fuel cell 10 obtained from the voltage sensor 56 becomes equal to or lower than a predetermined voltage.

Figure 7:
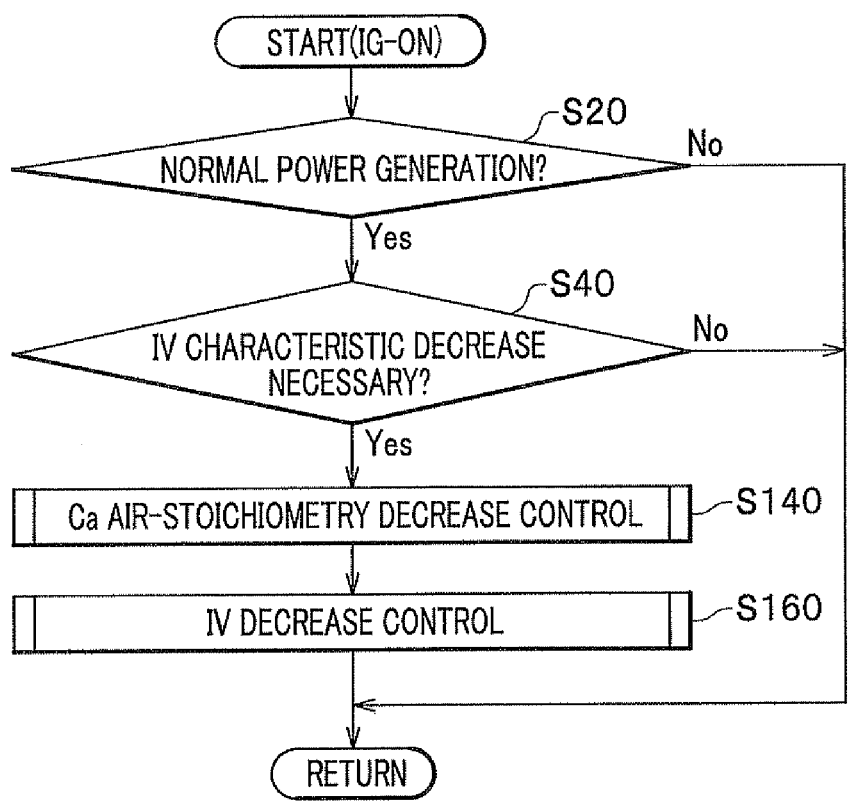
FIG. 7 is a flowchart illustrating an operation at the time of high-voltage suppression in a low-load condition.
Figure 8:
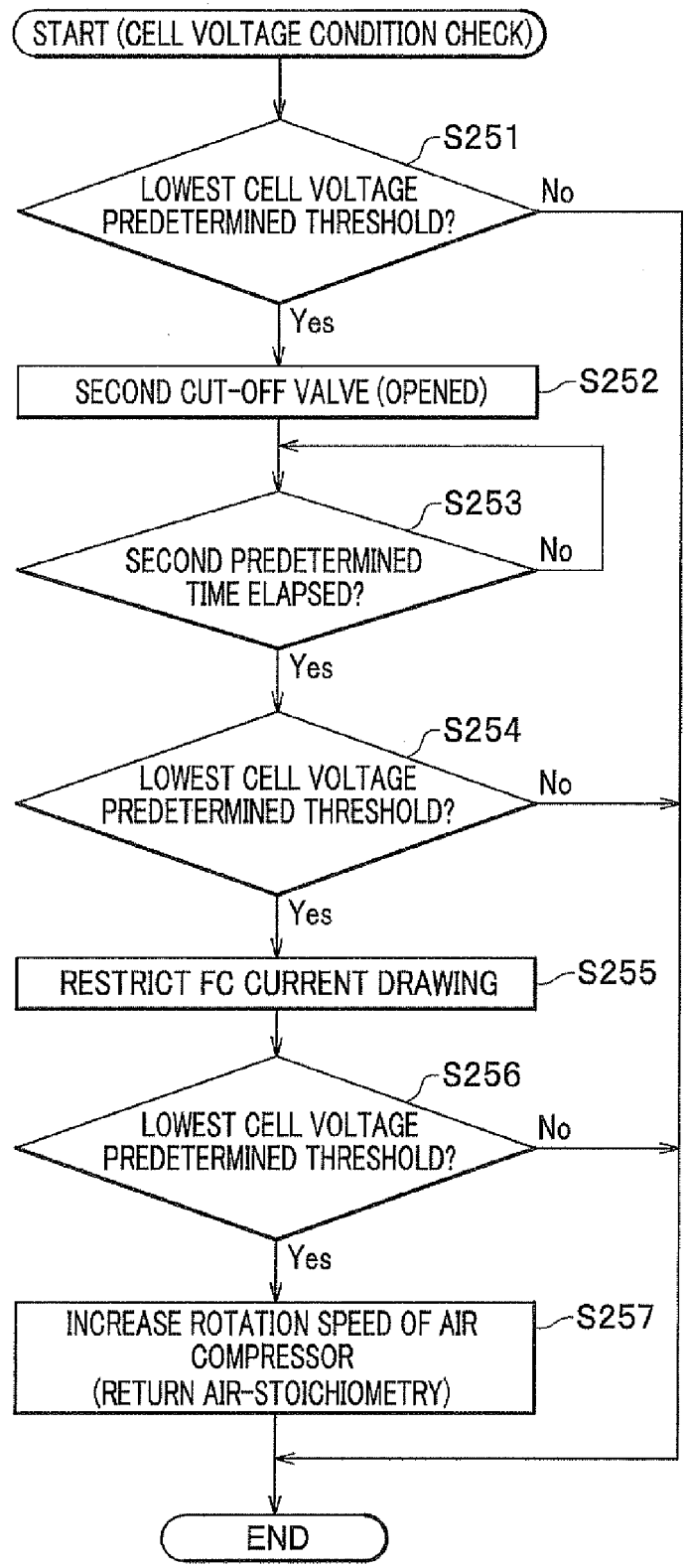
FIG. 8 is a flowchart illustrating an operation at the time of cell-voltage condition checking.
Figure 9:
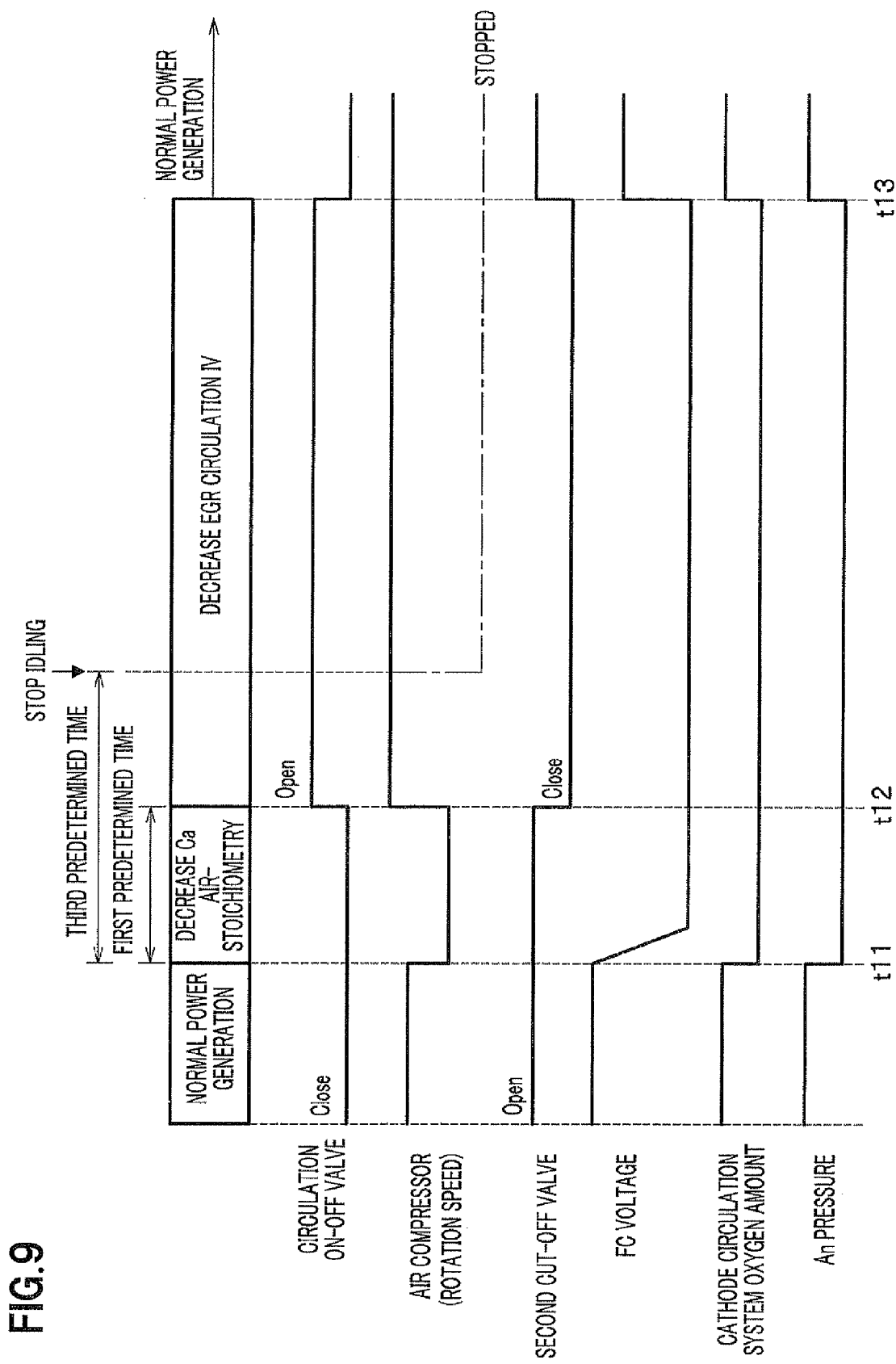
FIG. 9 is a time chart illustrating an example operation at the time of high-voltage suppression in a low-load condition.
Figure 10:
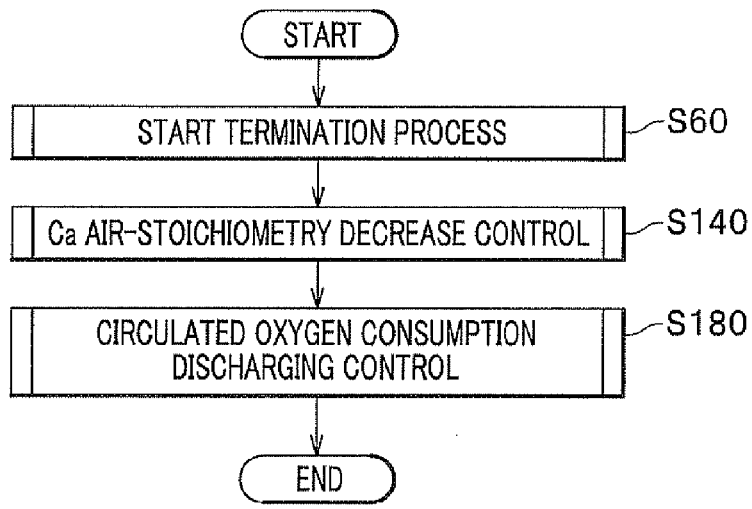
FIG. 10 is a flowchart illustrating an operation at the time of power-generation termination control.
Figure 11:
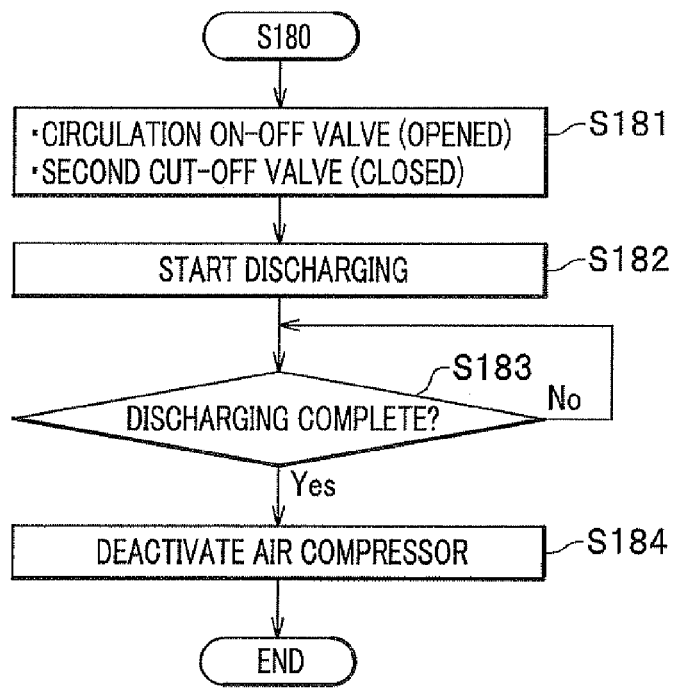
FIG. 11 is a flowchart illustrating an operation at the time of circulated oxygen consuming discharge control.
Figure 12:
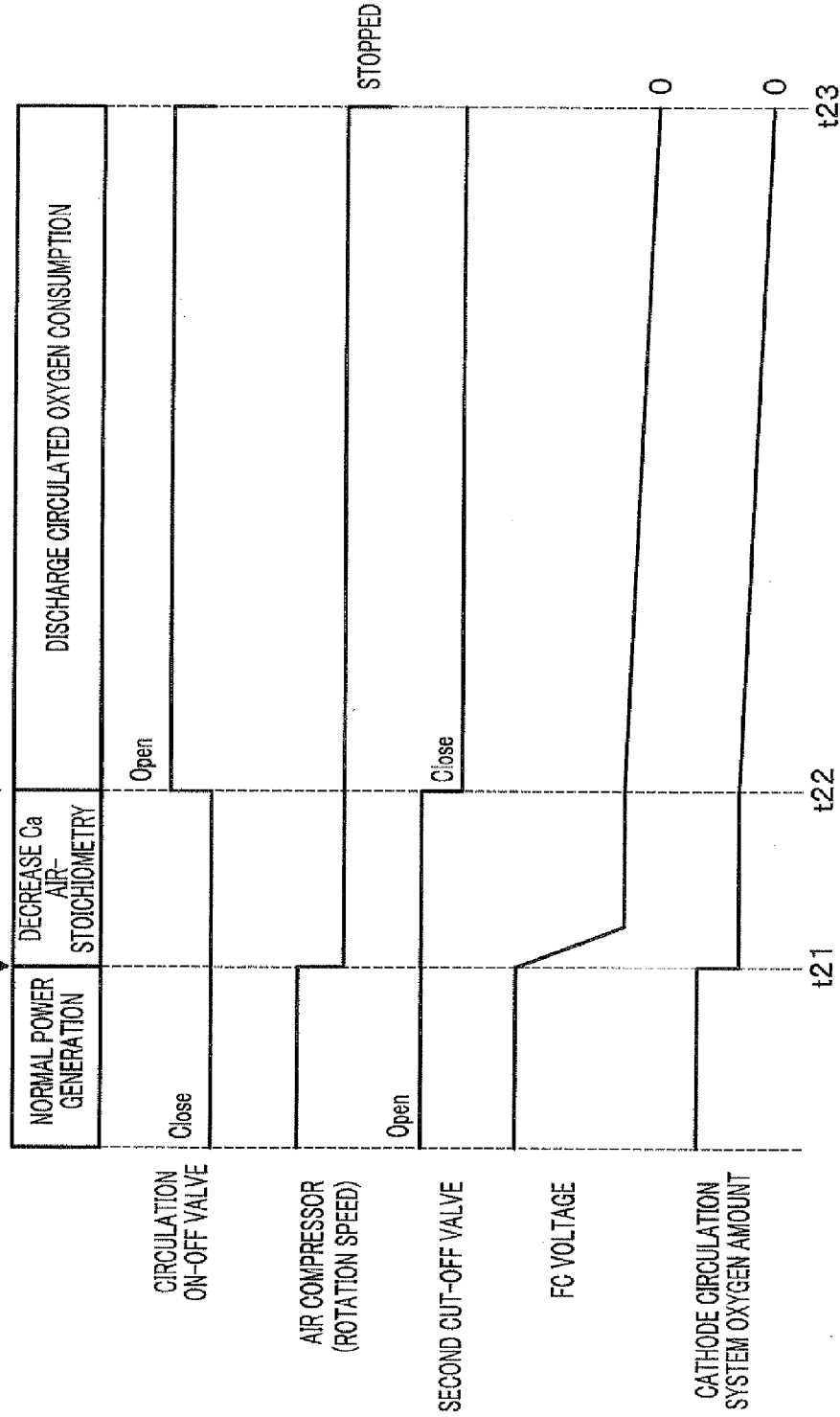
FIG. 12 is a time chart illustrating an example operation at the time of power-generation termination control.

Next, an explanation will be given of an operation of the fuel cell system of the present embodiment with reference to FIGS. 2 to 12 (and also FIG. 1 as needed). FIGS. 2 to 6 are flowcharts and time charts illustrating a control that is an operation in a first embodiment at the time of rapid warm-up control, FIGS. 7 to 9 are flowcharts and time charts illustrating a control that is an operation in a second embodiment at the time of high-voltage suppression in a low-load condition, and FIGS. 10 to 12 are flowcharts and time charts illustrating a control that is an operation in a third embodiment at the time of power generation termination. In the second and third embodiments, the same control as that of the first embodiment will be denoted by the same step reference numeral, and the duplicated explanation thereof will be omitted. FIG. 1 collectively illustrates necessary structures for operations in the first to third embodiments.

First Embodiment

FIG. 2 is a flowchart illustrating an operation at the time of rapid warm-up control. In the fuel cell system 1, before an ON signal from the IG 58 is detected, the air compressor 21 is deactivated, the first and second cut-off valves 22 and 23, the circulation on-off valve 26, the shut-off valve 32 and the purging valve 35 are closed, the open angle of the backpressure valve 24 is maximum, and the switch 45 is turned on.

When detecting an ON signal from the IG 58, the control unit 51 determines in step S100 whether or not a rapid warm-up for the fuel cell 10 is necessary (low-temperature warm-up determining unit). That is, the control unit 51 determines that the rapid warm-up of the fuel cell 10 is necessary (low-temperature activation) when the temperature of the fuel cell 10 is equal to or lower than a predetermined temperature (e.g., 0° C.) (step S100: YES).

Next, the control unit 51 sequentially performs OCV check control (activation control) in step S120, cathode (Ca) air-stoichiometry decrease control in step S140, and current/voltage (IV) decrease rapid warm-up control in step S160. The OCV check control, the Ca air-stoichiometry decrease control, and the IV decrease rapid warm-up control will be explained in detail with reference to FIG. 3, FIG. 4, and FIG. 5, respectively.

After the processes from the step S120 to the step S160 complete, the control unit 51 determines in step S180 whether or not the rapid warm-up completes. An example condition of the completion of the rapid warm-up is when the temperature of the fuel cell 10 reaches a temperature equal to or higher than a predetermined temperature (e.g., 10° C.).

When determining that the rapid warm-up has not been completed (step S180: NO), the control unit 51 repeats the process in the step S180, and when the rapid warm-up completes (step S180: YES), the process is terminated.

When determining in the step S100 that the temperature of the fuel cell 10 is not equal to or lower than the predetermined temperature (step S100: NO), the control unit 51 determines that no rapid warm-up is necessary, and the process proceeds to step S110. The process in the step S110 is the same as the process in step S120.

After the process in the step S110, the process proceeds to step S130, and the control unit 51 performs normal warm-up. The normal warm-up is performed until the temperature of the fuel cell 10 reaches a predetermined temperature.

FIG. 3 is a flowchart illustrating an operation at the time of OCV checking. The OCV checking is a process of, before a power generation, purging residue of gases in the anode circulation system including the anode flow channel 10b and replacing the interior of the anode circulation system with hydrogen in order to output power stably.

The control unit 51 starts supplying air to the fuel cell 10 in step S121. That is, the control unit 51 opens the first and second cut-off valves 22 and 23, and starts driving the air compressor 21 with the backpressure valve 24 being set to a predetermined open angle set in advance at the time of the OCV checking. Accordingly, the air compressed by the air compressor 21 is humidified by the humidifier not shown, and is supplied to the cathode flow channel 10a.

The control unit 51 starts hydrogen replacement to the anode circulation system (supply piping a4, anode flow channel 10b, discharging piping a5, and return piping a7) in step S122. That is, the control unit 51 opens the shut-off valve 32, and supplies, to the anode flow channel 10b, the hydrogen having undergone pressure reduction to a predetermined pressure by the pressure reducing valve 33. Moreover, the control unit 51 monitors how the cell voltage rises, opens the purging valve 35 as needed to repel gases (e.g., air) left in the anode circulation system, and newly supplies the hydrogen from the high-pressure hydrogen tank 31 to perform an OCV purging process.

When the hydrogen replacement of the anode circulation system advances in this manner, the OCV of the fuel cell 10 becomes high.

The control unit 51 determines in step S123 whether or not the OCV exceeds a predetermined voltage. The predetermined voltage is a voltage that ensures stable power (generated current) taken out from the fuel cell to the external load when the fuel cell 10 and the external load are connected together.

When determining in the step S123 that the OCV does not exceed the predetermined voltage (step S123: NO), the control unit 51 repeats the process in the step S123, and when determining that the OCV exceeds the predetermined voltage (step S123: YES), the control unit 51 determines that the OCV checking completes, and the process proceeds to step S124.

The control unit 51 starts power generation in the step S124. That is, the control unit 51 controls the power controller 43, and starts supplying power generated by the fuel cell 10 to the external loads, such as the high-voltage battery 42 and the air compressor 21. Next, the process proceeds to the step S140 in FIG. 2.

Figure 4:
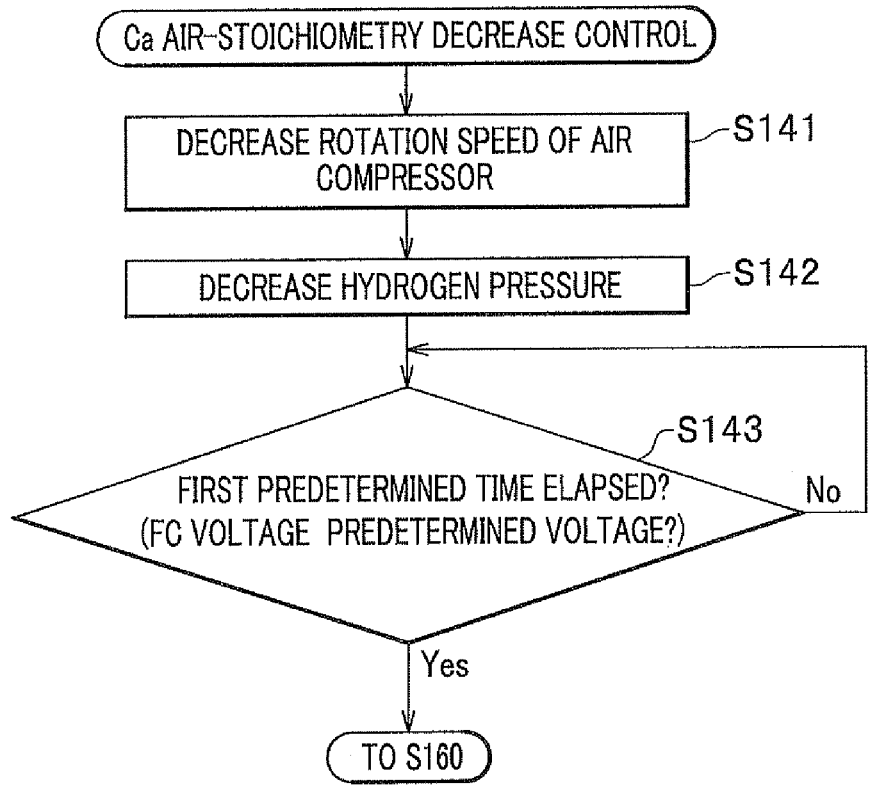
FIG. 4 is a flowchart illustrating an operation at the time of Ca air-stoichiometry decrease control.

FIG. 4 is a flowchart illustrating an operation at the time of Ca air-stoichiometry decrease control.

The control unit 51 performs a control of reducing the rotation speed of the air compressor 21 in step S141. That is, the control unit 51 reduces the rotation speed of the air compressor 21 in such a way that the air drawn from the exterior of the vehicle becomes a preset flow volume based on a detected flow rate value obtained through the flow volume sensor 54. The flow volume is set through a test, etc., carried out beforehand.

The control unit 51 decreases in step S142 the hydrogen pressure supplied to the anode flow channel 10b. That is, the control unit 51 controls the pressure reducing valve 33, and decreases the hydrogen pressure (hydrogen flow volume) at the anode side in accordance with the decrease in the flow volume (pressure) at the cathode side in the step S141. The process of decreasing the hydrogen pressure in the step S142 is not always necessary, and the hydrogen pressure at the time of the OCV checking may be set to be the same pressure (see a dotted line of An pressure in FIG. 6) as the hydrogen pressure in an idling condition.

The control unit 51 determines in step S143 whether or not a first predetermined time has elapsed after the start of the reduction of the rotation speed of the air compressor 21. The first predetermined time is set to be a time necessary until the voltage (FC voltage) of the fuel cell 10 is decreased to a predetermined voltage, and is set through a test, etc., beforehand. The first predetermined time corresponds to a predetermined time in claims.

When determining in the step S143 that the first predetermined time has not elapsed yet (step S143: NO), the control unit 51 repeats the process in the step S143, and when determining that the first predetermined time has elapsed (step S143: YES), the process proceeds to the step S160.

According to such a Ca air-stoichiometry decrease control, the amount of oxygen contained in the air supplied to the cathode flow channel 10*a* can be reduced by reducing the rotation speed of the air compressor 21, and thus the voltage Vfc of the fuel cell 10 can be decreased quickly. The processes in the steps S141 and S143 correspond to the process by the stoichiometry decreasing process unit.

Figure 5:
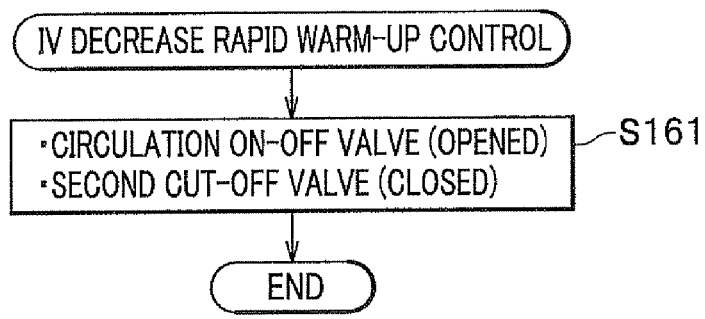
FIG. 5 is a flowchart illustrating an operation at the time of IV decrease rapid warm-up control.

FIG. 5 is a flowchart illustrating an operation at the time of IV decrease rapid warm-up control.

The control unit 51 opens the circulation on-off valve 26, while at the same time, closes the second cut-off valve 23 in step S161. Accordingly, the oxidant-off gases discharged from the cathode flow channel 10*a* circulate the cathode circulation system (discharging piping c4, introduction piping c8, supply pipings c1, c2, and c3, and cathode flow channel 10*a*). In the present embodiment, all oxidant-off gases discharged from the cathode flow channel 10*a* circulate the cathode circulation system.

By circulating the oxidant-off gases in the cathode circulation system in this manner, even if the flow volume of the air supplied to the cathode of the fuel cell 10 from the air compressor 21 decreases through the Ca air-stoichiometry decrease control, the flow volume of the gases supplied to the cathode flow channel 10*a* can be ensured. Accordingly, the cathode surface of the cathode flow channel 10*a* can be coated with the generated water, thereby suppressing an occurrence of a flooding phenomenon that deteriorates the power generation performance due to the inhibition of oxygen supply.

In the above-explained embodiment, although the explanation was given of an example case in which the circulation on-off valve 26 and the second cut-off valve 23 are simultaneously actuated, the present invention is not limited to this case, and the second cut-off valve 23 may be closed after the circulation on-off valve 26 is opened.

Figure 6:
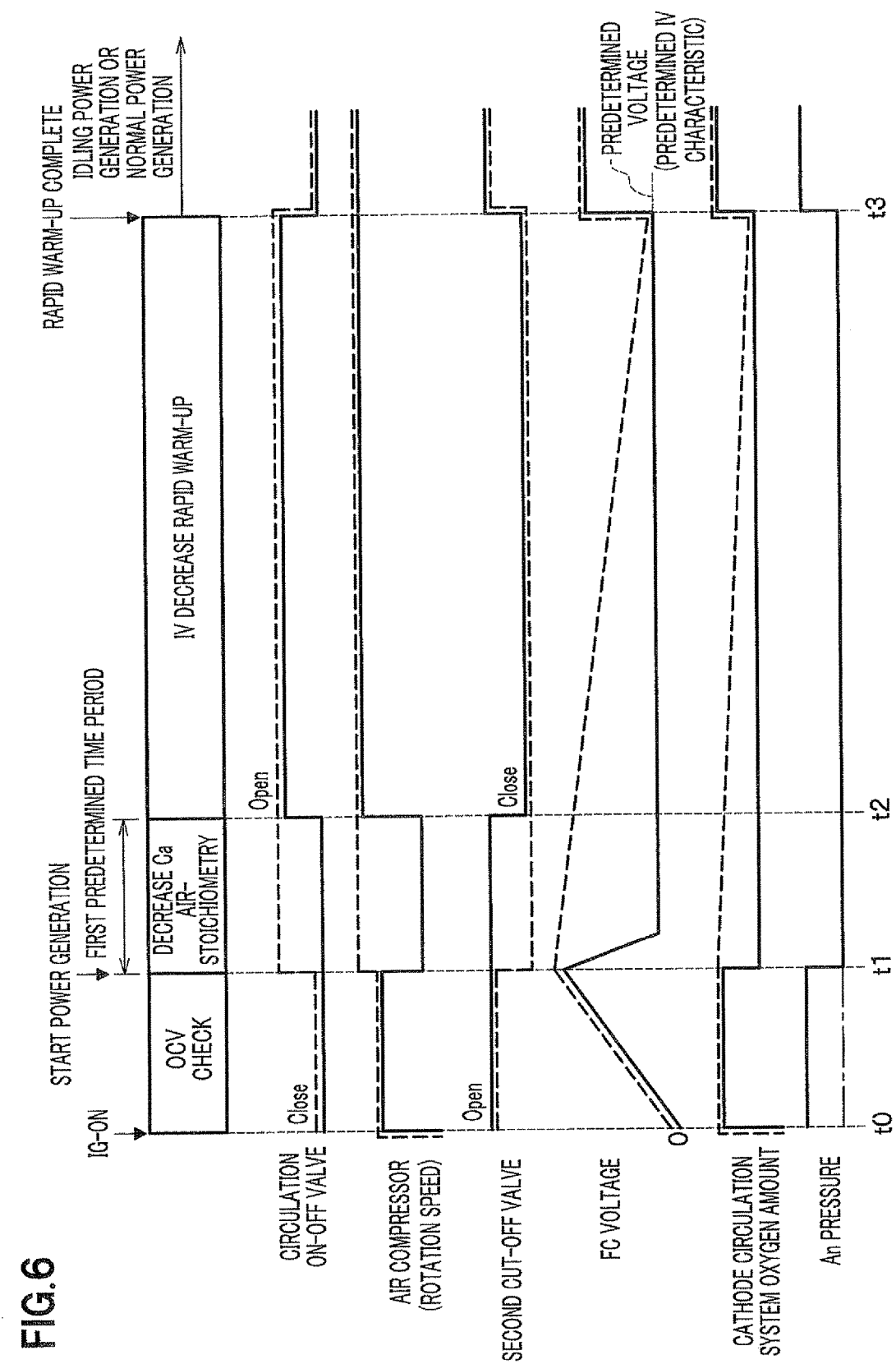
FIG. 6 is a time chart illustrating an example operation at the time of rapid warm-up.

FIG. 6 is a time chart illustrating an example operation at the time of rapid warm-up. A continuous line indicates the present embodiment, while a dashed line indicates a comparative example. In order to clarify the difference between the present embodiment and the comparative example, illustration is given with the continuous line and the dashed line being slightly shifted from each other.

As illustrated in FIG. 6, when the IG 58 is turned on, the OCV checking (step S120) is performed from a time point t0 to a time point t1. Accordingly, the OCV (FC voltage) gradually increases up to the predetermined voltage (not shown).

In the time point t1, when the OCV checking completes (step S123: YES), power generation is started (step S124), and the process is transitioned to the Ca air-stoichiometry decrease control (step S140) to reduce the rotation speed of the air compressor 21 (step S141). Accordingly, the amount of oxygen in the cathode circulation system (discharging piping c4, introduction piping c8, supply pipings c1 to c3, and cathode flow channel 10*a*) immediately decreases, and thus the FC voltage (IV characteristic) can be decreased quickly. By decreasing the FC voltage in this manner, it becomes possible for the fuel cell system to cause the fuel cell 10 to generate power in a poor efficiency condition daringly, thereby increasing the amount of self-heat-generation of the fuel cell 10.

In contrast, as is indicated by the dashed line in the comparative example, when the circulation on-off valve is opened and the second cut-off valve is simultaneously closed after the OCV checking, only a little amount of oxygen in the cathode circulation system decreases, and thus it is difficult to decrease the IV characteristic quickly unlike the present embodiment.

Next, the Ca air-stoichiometry decrease control is performed for a first predetermined time period (from time t1 to time t2). By setting the time period to be the first predetermined time period, the FC voltage can be reduced to a predetermined voltage, i.e., the fuel cell 10 can be decreased to a predetermined IV characteristic.

Next, at the time point t2 having the first predetermined time period elapsed after the start of the Ca air-stoichiometry decrease control, the process proceeds to an IV decrease rapid warm-up control (step S160), and the circulation on-off valve 26 is opened, while at the same time, the second cut-off valve 23 is closed (step S161). At the time point t2, the rotation speed of the air compressor 21 is increased, but the amount of oxygen in the cathode circulation system temporary increases and are consumed immediately in the fuel cell 10, and the oxidant-off gases having the oxygen consumed start circulating thereafter, and thus the amount of oxygen in the cathode circulation system transitions at the same oxygen amount as that of the Ca air-stoichiometry decrease control.

Next, at a time point t3, when the temperature of the fuel cell exceeds a predetermined temperature (warm-up complete temperature, e.g., 10° C.), it is determined that the warm-up has completed (step S180: YES), and the process proceeds to power generation (normal power generation) in accordance with the open angle of the accelerator pedal 59 when the accelerator pedal is depressed, or the process proceeds to idling power generation (idling operation) when the open angle of the accelerator pedal 59 and the speed detected by the vehicle speed sensor 61 are both zero when the brake pedal 60 is depressed. At the time point t3, the circulation on-off valve 26 is closed, and the second cut-off valve 23 is opened.

As explained above, according to the first embodiment, when the fuel cell 10 is subjected to a low-temperature activation (when the predetermined condition is satisfied), the rotation speed of the air compressor 21 (oxidant gas supply unit) is reduced to decrease the supply amount of the air (oxidant gases) and to decrease the stoichiometric amount of air of the fuel cell 10, thereby quickly decreasing the IV characteristic to the predetermined IV characteristic. In addition, after the air-stoichiometry is decreased, the circulation on-off valve 26 is opened, and the oxidant-off gases are introduced in the supply piping c1 (oxidant gas supply flow channel) to circulate the oxidant-off gases, the sufficient amount of gases can be maintained. Accordingly, the discharging of the generated water remained in the cathode flow channel 10*a* can be prompted, and the occurrence of flooding can be suppressed, thereby ensuring the stable power generation.

According to the first embodiment, the circulation on-off valve 26 is opened, while at the same time, the second cut-off valve 23 (discharging on-off valve) is closed (see step S161 in FIG. 5), and thus the whole amount of oxidant-off gases can be introduced in the introduction piping c8 to circulate such gases therethrough. Hence, the sufficient amount of circulated oxidant-off gases can be ensured, and thus the discharge of the generated water remained in the fuel cell 10 can be further prompted.

According to the first embodiment, the process of decreasing the air-stoichiometry (Ca air-stoichiometry decrease control) is terminated based on a time (the first predetermined time period), the control can be simplified.

A configuration of detecting that the IV characteristic reaches the predetermined IV characteristic is not limited to a configuration based on the time, but it may be determined based on the voltage Vfc (FC voltage) of the fuel cell 10 detected by the voltage sensor 56. Accordingly, it can be surely determined whether or not the IV characteristic reaches the predetermined IV characteristic, and the warm-up control after such a determination can be accelerated.

Second Embodiment

FIG. 7 is a flowchart illustrating an operation at the time of high-voltage suppression in a low-load condition. FIG. 8 is a flowchart illustrating an operation at the time of cell-voltage condition checking. FIG. 9 is a time chart illustrating an example operation at the time of high-voltage suppression in a low-load condition. The same structure as that of the first embodiment will be denoted by the same step number to eliminate the duplicated explanation. In a second embodiment, an explanation will be given of a case in which the IV is decreased during a normal power generation.

As illustrated in FIG. 7, the control unit 51 determines in step S20 whether or not it is in a normal power generation. Terms "in a normal power generation" mean a condition in which the fuel cell electric vehicle is running and the power taken out from the fuel cell 10 varies depending on the open angle of the accelerator pedal 59.

When determining in the step S20 that it is in the normal power generation (step S20: YES), the process proceeds to step S40, and when determining that it is not in the normal power generation (step S20: NO), the control unit 51 terminates the process without executing the steps S40, S140 and S160.

The control unit 51 determines in the step S40 whether or not it is necessary to decrease the IV characteristic, and when determining that it is necessary to decrease the IV characteristic (step S40: YES), the process proceeds to step S140, and when determining that it is unnecessary to decrease the IV characteristic (step S40: NO), the control unit 51 terminates the process.

A case in which it is necessary to decrease the IV characteristic during the normal power generation is a case in which, for example, the fuel cell electric vehicle is stopped for waiting a signal, and the power generation is shifted from the normal power generation to the idling power generation (idling condition). The power generation is shifted to the idling power generation when the control unit 51 detects that the open angle of the accelerator pedal 59 is zero, the brake pedal 60 is depressed, and the vehicle speed detected through the vehicle speed sensor 61 is zero.

When the power generation is shifted from the normal power generation to the idling power generation with the IV characteristic being high, since the voltage is maintained to be high, for example, it becomes difficult to charge the high-voltage battery 42 with generated power by the fuel cell 10, and the fuel cell 10 is revealed with the high potential for a long time, which results in the deterioration of the fuel cell 10. Hence, also in the normal power generation, when the power generation is shifted to the idling power generation, the IV characteristic is decreased to decrease the FC voltage Vfc. This enables a charging of the high-voltage battery 42, and a transition to the idling power generation.

In the Ca air-stoichiometry decrease control (step S140) and the IV decrease control (step S160) illustrated in FIG. 7, when it is expected that the stable power generation decreases, the cell-voltage condition checking control illustrated in FIG. 8 may be performed as needed.

As illustrated in FIG. 8, the control unit 51 determines in step S251 whether or not the lowest cell voltage is equal to or smaller than a predetermined threshold. The lowest cell voltage means, for example, the lowest cell voltage among the cell voltages of all single cells constructing the fuel cell 10. When the lowest cell voltage is detected, it is unnecessary to detect cell voltages of all single cells but a cell voltage for each single cell or for each two single cells may be detected instead.

When determining in the step S251 that the lowest cell voltage is equal to or smaller than the predetermined threshold (step S251: YES), the process proceeds to step S252, and the second cut-off valve 23 is opened. Hence, the flow volume of the oxidant-off gases introduced in the introduction piping c8 is reduced, the flow volume of air taken from the exterior (exterior of the vehicle) increases, and the amount of oxygen supplied to the cathode flow channel 10a increases.

The control unit 51 determines in step S253 whether or not a second predetermined time period after the second cut-off valve 23 is opened has elapsed. The second predetermined time period is determined through a test, etc., in advance. When the second cut-off valve 23 is opened for the second predetermined time and the gases in the cathode circulation system is purged, it becomes possible to recover the stable power generation.

The control unit 51 determines again in step S254 whether or not the lowest cell voltage is equal to or smaller than the predetermined threshold, and when determining that the lowest cell voltage is still equal to or smaller than the predetermined threshold (step S254: YES), the process proceeds to step S255, and regulates the drawing of the generated current from the fuel cell 10. By regulating the drawing of the generated current from the fuel cell 10, the consumption amount of air corresponding to the generated current is reduced and the stoichiometric ratio is increased, and thus the lack of air-stoichiometry can be addressed, thereby recovering the stable power generation.

The control unit 51 further determines in step S256 whether or not the lowest cell voltage is equal to or smaller than the predetermined threshold, and when determining that the lowest cell voltage is yet equal to or smaller than the predetermined threshold (step S256: YES), the process proceeds to step S257 and executes a control of increasing the rotation speed of the air compressor 21, i.e., recovering the air-stoichiometry.

When determining in the steps S251, S254, and S256 that the lowest cell voltage is not equal to or smaller than the predetermined threshold (steps S251, S254, and S256: YES), i.e., when the stable power generation is ensured, the control unit 51 returns the process to the flow in FIG. 7, and executes (continues) the Ca air-stoichiometry decrease control and IV decrease control.

The FC current drawing regulation in the step S255 and the air-stoichiometry recovery in the step S257 may have respective execution orders changed with each other. Moreover, in FIG. 8, the explanation was given of the purging at the cathode side, but the above-explained processes may be combined as needed and applied to the purging at the anode side.

As illustrated in FIG. 9, when the power generation is shifted to the idling power generation at a time point t11 during the normal power generation, the process proceeds to the Ca air-stoichiometry decrease control (step S140), and the rotation speed of the air compressor 21 is reduced.

Accordingly, the amount of oxygen in the cathode circulation system decreases, and thus the FC voltage Vfc quickly lowers. The FC voltage Vfc (IV characteristic) lowered in this manner enables charging of the high-voltage battery 42 with the generated power during the idling power generation.

At a time point t12 after the Ca air-stoichiometry decrease control is performed for the first predetermined time, the process transitions to the IV decrease control, the circulation on-off valve 26 is opened, while at the same time, the second cut-off valve 23 is closed, and the oxidant-off gases are caused to circulate in the cathode circulation system. Accordingly, only oxygen contained in the air is consumed but the amount of gases in the cathode circulation system is ensured, and the discharging of the generated water in the cathode flow channel 10a is prompted, which suppresses an occurrence of flooding. Hence, the stable power generation is ensured.

At a time point t13, when the power generation is shifted from the idling power generation to the normal power generation during the IV decrease control, the circulation on-off valve 26 is closed and the second cut-off valve 23 is opened, thereby terminating the circulation of the oxidant-off gases.

At the time point t11, after the power generation is shifted from the normal power generation to the idling power generation, when a third predetermined time period (counted by the timer 62) has elapsed, if the idling power generation is still performed without a shift to the normal power generation, the air compressor 21 may be deactivated to shift a condition to an idle stop condition (see dashed lines in FIG. 9).

As explained above, according to the second embodiment, when it is also necessary to decrease the IV characteristic during the normal power generation (when the predetermined condition is satisfied), by decreasing the air-stoichiometry of the fuel cell 10, the IV characteristic can be quickly decreased, and thus the high-voltage battery 42 can be charged with the generated power. Moreover, by causing the oxidant-off gases to circulate after the air-stoichiometry is decreased, the gas amount in the cathode circulation system can be ensured, suppressing an occurrence of flooding, thereby ensuring the stable power generation.

Third Embodiment

FIG. 10 is a flowchart illustrating an operation at the time of power-generation termination control. FIG. 11 is a flowchart illustrating an operation at the time of circulated oxygen consuming discharge control. FIG. 12 is a time chart illustrating an example operation at the time of power-generation termination control. The same structure as that of the first embodiment will be denoted by the same step number, and the duplicated explanation thereof will be omitted. In a third embodiment, an explanation will be given of a case in which the fuel cell 10 is discharged before the cathode flow channel 10a is blocked at the time of power generation termination.

As illustrated in FIG. 10, the control unit 51 starts a termination process in step S60 when detecting an OFF signal from the IG 58. That is, the control unit 51 closes the cut-off valve 32 and terminates the supply of the hydrogen to the fuel cell 10.

The control unit 51 executes the Ca air-stoichiometry decrease control in the step S140, and executes a circulated oxygen consuming discharge control in step S180. After the completion of the Ca air-stoichiometry decrease control, the control unit 51 controls the power controller 43 to terminate drawing of the generated power to the external load.

As illustrated in FIG. 11, the control unit 51 opens the circulation on-off valve 26, and at the same time, closes the second cut-off valve 23 in step S181.

The control unit 51 starts discharging in step S182. That is, the control unit 51 turns on the switch 45 (closed) to connect the fuel cell 10 with the discharging resistor 44. Accordingly, the power generated by the fuel cell 10 is discharged through the discharging resistor 44.

The control unit 51 determines in step S183 whether or not the discharging of the fuel cell 10 completes. Whether or not the discharging completes can be determined by detecting the voltage (FC voltage) Vfc of the fuel cell 10, and when, for example, the voltage Vfc becomes zero, all hydrogen remained in the anode circulation system including the anode flow channel 10b are consumed, and it is determined that the discharging completes.

When determining in the step S183 that the discharging has not completed (step S183: NO), the control unit 51 repeats the process in the step S183, and when determining that the discharging completes (step S183: YES), the process proceeds to step S184, and deactivates the air compressor 21.

As illustrated in FIG. 12, at a time point t21, when the IG 58 is turned off, the process proceeds to the Ca air-stoichiometry decrease control (step S140), and the rotation speed of the air compressor 21 is reduced. Accordingly, the amount of oxygen in the cathode circulation system decreases, and thus the FC voltage Vfc quickly decreases. The decrease of the FC voltage Vfc (IV characteristic) in this manner prevents the fuel cell 10 from being revealed to the high potential for a long time, thereby suppressing a deterioration of the fuel cell 10.

Next, at a time point t22 after the Ca air-stoichiometry decrease control is performed for the first predetermined time, the process proceeds to the circulated oxygen consuming discharge control (step S180), the circulation on-off valve 26 is opened, while at the same time, the second cut-off valve 23 is closed to cause the oxidant-off gases to circulate in the cathode circulation system. Moreover, the air compressor 21 has the rotation speed maintained to be the same rotation speed at the time of, for example, the Ca air-stoichiometry decrease control.

Accordingly, the amount of gases in the cathode circulation system is maintained as it is, but only the oxygen contained in the air is caused to react with hydrogen and is consumed. Hence, the amount of oxygen in the cathode circulation system gradually decreases, and the FC voltage Vfc gradually decreases in accordance with the decrease of the amount of oxygen.

Next, at a time point t23, when the FC voltage Vfc becomes zero, the air compressor 21 is deactivated, and the first cut-off valve 22 is closed with the closed condition of the second cut-off valve 23 being maintained. Accordingly, the fuel cell system 1 is deactivated with the cathode flow channel 10a being blocked.

As explained above, according to the third embodiment, when the power generation is terminated (when the predetermined condition is satisfied), the air-stoichiometry of the fuel cell 10 is decreased, thereby quickly decreasing the FC voltage Vfc. Accordingly, it becomes possible for the fuel cell system to prevent the fuel cell 10 from being revealed to a high potential. Thereafter, by causing the oxidant-off gases to circulate, the amount of gases in the cathode circulation system is ensured to suppress a flooding, and the oxygen contained in the air circulating the cathode circulation system can be gradually consumed.

The present invention is not limited to the above-explained embodiments, and can be changed and modified in various forms without departing from the scope of the present invention. For example, the explanation was given of the example case in which the second cut-off valve 23 is used as a discharging on-off valve in the above-explained embodiments, the backpressure valve 24 may be used as the discharging on-off valve instead of the second cut-off valve 23. That is, in the step S161 in FIG. 5, the backpressure valve 24 may be simultaneously closed (e.g., fully closed) when the circulation on-off valve 26 is opened to introduce the all amount of oxidant-off gases discharged from the cathode flow channel 10a to the supply piping c1 through the introduction piping c8 (the same is true of the step S181 in FIG. 11).

What is claimed is:

1. A method for controlling a fuel cell system comprising:
   providing a fuel cell which comprises an anode and a cathode and which generates an electric power when a fuel gas and an oxidant gas are supplied to the anode and the cathode, respectively;
   providing an oxidant gas supplying unit configured to supply the oxidant gas to the cathode;
   providing an oxidant gas supplying flow channel communicating with the cathode;
   providing an oxidant-off gas discharging flow channel communicating with the cathode;
   providing an oxidant-off gas introducing flow channel communicating with the oxidant-off gas discharging flow channel and the oxidant gas supplying flow channel;
   providing a circulation on-off valve provided in the oxidant-off gas introducing flow channel;
   supplying the oxidant gas to the cathode through the oxidant gas supplying flow channel by the oxidant gas supplying unit;
   discharging an oxidant-off gas from the cathode to the oxidant-off gas discharging flow channel;
   decreasing a supply amount of the oxidant gas by the oxidant gas supplying unit with the circulation on-off valve closed when the fuel cell activated has been determined to be in the low-temperature activation condition, and decreasing a stoichiometry of the oxidant gas of the fuel cell to decrease a current/voltage characteristic of the fuel cell;
   detecting a voltage value output by the fuel cell; and
   introducing a part of the oxidant-off gas into the oxidant gas supplying flow channel through the oxidant-off gas introducing flow channel by opening the circulation on-off valve when the current/voltage characteristic of the fuel cell has decreased to a predetermined current/voltage characteristic, based on the detected voltage value, after the process of decreasing the stoichiometry of the oxidant gas of the fuel cell, and causing the part of the oxidant-off gas to circulate through the cathode and an oxygen amount in a cathode circulation system during the process of introducing the part of the oxidant-off gas into the oxidant gas supplying flow channel to be equal to or less than an oxygen amount in the cathode circulation system during the process of decreasing the stoichiometry of the oxidant gas of the fuel cell.

2. The method for controlling a fuel cell system according to claim 1, further comprising:
   providing a discharging on-off valve provided in the oxidant-off gas discharging flow channel at a downstream side of a communication point with the oxidant-off gas introducing flow channel; and
   closing the discharging on-off valve when the circulation on-off valve opens.

3. The method for controlling a fuel cell system according to claim 1, further comprising:
   terminating the process of decreasing the stoichiometry of the oxidant gas when the current/voltage characteristic is determined to be a threshold.

4. The method for controlling a fuel cell system according to claim 2, further comprising:
   terminating the process of decreasing the stoichiometry of the oxidant gas when the current/voltage characteristic is determined to be a threshold.

5. The method for controlling a fuel cell system according to claim 1, further comprising:
   counting a time elapsed from a start of the process of decreasing the stoichiometry of the oxidant gas; and
   terminating the process of decreasing the stoichiometry of the oxidant gas when the elapsed time is a predetermined time.

6. The method for controlling a fuel cell system according to claim 2, further comprising:
   counting a time elapsed from a start of the process of decreasing the stoichiometry of the oxidant gas; and
   terminating the process of decreasing the stoichiometry of the oxidant gas when the elapsed time is a predetermined time.

7. The method for controlling a fuel cell system according to claim 1, wherein the part of the oxidant-off gas circulates through the cathode with the stoichiometry of the oxidant gas of the fuel cell decreased.

8. The method for controlling a fuel cell system according to claim 1, wherein the process of introducing the part of the oxidant-off gas into the oxidant gas supplying flow channel starts simultaneously when the process of decreasing the stoichiometry of the oxidant gas of the fuel cell is terminated.

9. The method for controlling a fuel cell system according to claim 1, wherein a current/voltage characteristic of the fuel cell during the process of introducing the part of the oxidant-off gas into the oxidant gas supplying flow channel to be equal to or less than a current/voltage characteristic of the fuel cell during the process of decreasing the stoichiometry of the oxidant gas of the fuel cell.

* * * * *